March 26, 1940.  K. SCHMIDT  2,194,483
AIRPLANE RIB
Filed April 17, 1939
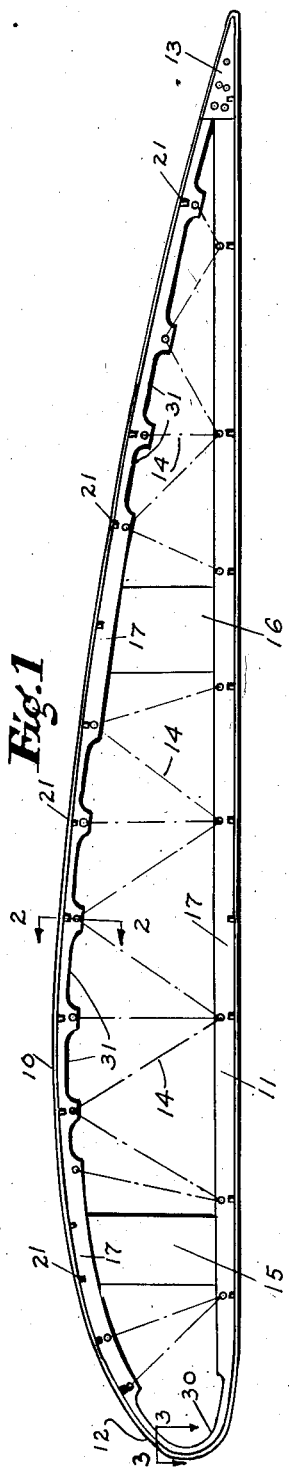
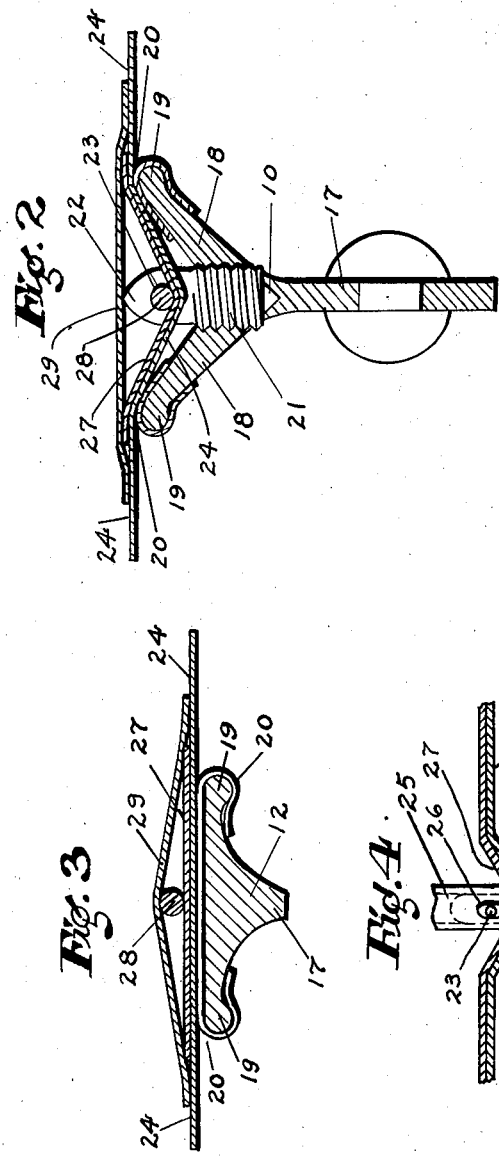
INVENTOR
KARL SCHMIDT
BY
ATTORNEY Patented Mar. 26, 1940

2,194,483

UNITED STATES PATENT OFFICE 2,194,483

AIRPLANE RIB

Karl Schmidt, United States Navy

Application April 17, 1939, Serial No. 268,323

1 Claim. (Cl. 244—132)

(Granted under the act of March 3, 1883, as amended April 30, 1928; 370 O. G. 757)

This invention relates to airplane ribs and it has a particular relation to the capstrip portions thereof to which the envelope or covering is secured.

The principal object of this invention is the provision of an airplane wing rib which is so constructed that the fabric covering may be attached thereto continuously throughout the entire length of the rib, thus avoiding localized strains and insuring that the covering is stretched tightly with evenly distributed tension so that the full strength of the cover fabric may be developed.

Another object of the invention is the provision of an airplane wing rib and cooperating cover fastening device by means of which the cover may be secured in position without rupturing the same and when thus secured will present a smooth cambered surface of high aerodynamic efficiency.

With these and other objects in view, as well as other advantages that may be incident to the use of the improvements, the invention consists in the parts and combinations thereof hereinafter set forth and claimed, with the understanding that the several necessary elements constituting the same may be varied in proportion and arrangement without departing from the nature and scope of the invention, as defined in the appended claim.

In order to make the invention more clearly understood, there are shown in the accompanying drawing, means for carrying the invention into practical use, without limiting the improvements in their useful application to the particular construction, which, for the purpose of explanation, have been made the subject of illustration.

In the accompanying drawing:

Fig. 1 is a diagrammatic side elevational view of an airplane wing rib constructed in accordance with the invention;

Fig. 2 is an enlarged transverse sectional view through the upper capstrip of the rib taken on line 2—2 of Fig. 1;

Fig. 3 is a similar view taken on line 3—3 of Fig. 1; and

Fig. 4 is a fragmentary view of the tool employed in securing the covering in position.

Referring to the drawing, an airplane wing rib constructed in accordance with the invention is shown as comprising upper and lower capstrings 10 and 11 respectively, the same being joined at the leading edge of the rib by an integral curved portion 12 and at the trailing edge thereof by a gusset plate 13. The capstrips 10 and 11 are connected together at intermediate points by diagonal bracing members, indicated at 14, and the several ribs so constructed are secured to fore-and-aft longitudinal beams 15 and 16 respectively.

The capstrips 10 and 11 each comprise an inner vertical flange 17 and outer diverging flanges 18 formed with rounded edges 19 (Fig. 2), which latter have a strip of some smooth material 20, such as Cellophane, glued thereto to reduce friction with the wing fabric. A plurality of studs 21 are threaded into the bottom of the depression formed by the flanges 18 at spaced intervals and are formed with tapered or pointed outer ends 22 and with apertures 23. A fabric covering or envelope 24 is stretched over the capstrip and flexed downwardly into the depression between the flanges 18 by a suitable tool, the pointed ends 22 of the studs 21 piercing the fabric between the warp and woof threads thereof, thereby avoiding rupturing the covering. The tool employed for this purpose preferably embodies a cylindrical barrel or tube 25 (Fig. 4), having an internal diameter sufficient to fit over the ends of the studs 21 and formed with a notch 26 at its lower end adapted to register with the apertures 23 when it is in its lowermost position. A reinforcing tape 27 is cemented to the covering 24 prior to the securing operation and is also pierced by the pointed ends of the studs 21 when the covering is flexed into the depression. When this operation is completed a securing wire 28 is threaded through the apertures 23 of the studs so as to provide a continuous fastening means extending the entire length of the rib. In practice this wire will extend entirely around the rib and its ends twisted together or otherwise secured at the trailing end of the rib. This securing wire also serves to prevent the studs from unscrewing. Thereafter, a tape 29 is cemented to the covering 24 so as to bridge the depression formed where the covering is flexed inwardly and to cover the outer ends of the studs 21, thus providing a smooth, unbroken cambered surface for the wing of high aerodynamic efficiency.

The leading edge 12 of the rib where they curve abruptly are flattened, as shown in Fig. 3, and the inner flanges are cut away, as indicated at 30 (Fig. 1). Also, the upper capstrip 10 may have its inner flange portion 17 cut away at intervals, as indicated at 31 in order to reduce weight. The inner flange 17 of the lower capstrip 11 is, however, left intact to provide the necessary compressive strength.

From the foregoing it will be apparent that a very efficient cover attaching means is provided and one which will permit of the quick and easy removal of the covering for replacement or repairs with minimum injury to the covering.

It will be understood that the above description and accompanying drawing comprehend only the general and preferred embodiment of the invention, and that various other changes in the construction, proportion and arrangement of the parts may be made by those skilled in the art without departing from the nature and scope of the invention as defined in the appended claim.

The invention described herein may be manufactured and/or used by or for the Government of the United States of America for governmental purposes without the payment of any royalties thereon or therefor.

I claim:

An airplane wing rib construction comprising a capstrip having an inwardly extending web portion and outwardly extending diverging flanges forming a longitudinal depression, a plurality of spaced studs fixed in said depression and having apertures extending therethrough, a fabric covering extending over said capstrip and flexed into said depression, said studs having tapered outer ends adapted to pierce said covering between the threads of the weave thereof to prevent the rupture of said covering and a securing wire extending along the bottom of said depression above said covering and through the apertures in said studs for securing said covering to said capstrip within the surface of the wing.

KARL SCHMIDT.